United States Patent
Addeo et al.

[11] Patent Number: 5,423,985
[45] Date of Patent: Jun. 13, 1995

[54] MODULAR ELEMENT FOR ABSORBING OILY SUBSTANCES FROM SURFACES OF WATER BODIES AND PURIFICATION SYSTEM USING SUCH ELEMENTS

[75] Inventors: Antonio Addeo, Novara; Alberto Verzelli, Milan, both of Italy

[73] Assignee: Centro Sviluppo Settori Impiego S.r.l., Milan, Italy

[21] Appl. No.: 88,777

[22] Filed: Jul. 8, 1993

[30] Foreign Application Priority Data

Jul. 9, 1992 [IT] Italy ............... MI92A1669

[51] Int. Cl.⁶ ............................................. E02B 15/04
[52] U.S. Cl. ................. 210/242.4; 210/924; 210/693
[58] Field of Search ........... 210/242.3, 242.4, 693, 210/671, 924, 680, 691–692, 923

[56] References Cited

U.S. PATENT DOCUMENTS

| | | | |
|---|---|---|---|
| 3,537,587 | 11/1970 | Kain | 210/924 |
| 3,539,013 | 11/1970 | Smith | 210/242.4 |
| 3,565,257 | 2/1971 | Cavalieri | 210/242.4 |
| 3,607,741 | 9/1971 | Sohnius | 210/242.4 |
| 3,617,551 | 11/1971 | Johnston et al. | 210/693 |
| 3,679,058 | 7/1972 | Smith | 210/924 |
| 3,739,913 | 6/1973 | Bogosian | 210/242.4 |
| 3,744,638 | 7/1973 | Rhodes | 210/924 |
| 3,764,527 | 10/1973 | Sohl | 210/693 |
| 3,888,766 | 6/1975 | De Young | 210/693 |
| 3,962,083 | 6/1976 | Goldman | 210/924 |
| 4,039,489 | 8/1977 | Fletcher et al. | 210/924 |
| 4,065,923 | 1/1978 | Preus | 210/923 |
| 4,070,287 | 1/1978 | Wiegand et al. | 210/693 |
| 4,083,778 | 4/1978 | McGrew | 210/693 |
| 4,107,051 | 8/1978 | Lorentzen | 428/109 |
| 4,111,813 | 9/1978 | Preus | 210/282 |
| 4,146,477 | 3/1979 | Challener | 210/924 |
| 4,183,984 | 10/1980 | Browers et al. | 210/242.4 |
| 4,279,757 | 7/1981 | DeBeuckelaer | 210/693 |
| 4,332,854 | 6/1982 | Parker | 210/924 |
| 4,356,089 | 10/1982 | Challener et al. | 210/924 |
| 4,366,067 | 12/1982 | Golding et al. | 210/671 |
| 4,395,336 | 7/1983 | Eng | 210/693 |
| 4,497,712 | 2/1985 | Cowling | 210/242.4 |
| 4,737,394 | 4/1988 | Zafiroglu | 210/924 |
| 4,919,820 | 4/1990 | Lafay et al. | 210/242.4 |
| 5,039,414 | 8/1991 | Mueller et al. | 210/680 |
| 5,135,660 | 8/1992 | Chromecek et al. | 210/693 |
| 5,156,743 | 10/1992 | Muncrief | 210/693 |
| 5,186,831 | 2/1993 | De Petris | 210/242.4 |
| 5,227,072 | 7/1993 | Brinkley | 210/693 |
| 5,229,006 | 7/1993 | Brinkley | 210/924 |
| 5,256,466 | 10/1993 | Berringan et al. | 210/924 |

FOREIGN PATENT DOCUMENTS 0069675  1/1983  European Pat. Off.
0295911 12/1988  European Pat. Off.

Primary Examiner—Cynthia L. Nessler
Attorney, Agent, or Firm—Bryan Cave; Dvid M. Klein

[57] ABSTRACT

A module for removing polluting agents from the surface of the sea consists of absorbent polyolefinic fibres enclosed inside a permeable sheath having a short-length bundle configuration with a star-like or lenticular cross-section. After absorbing oily substances, the cross-section of the module becomes polygonal or circular.

5 Claims, 4 Drawing Sheets

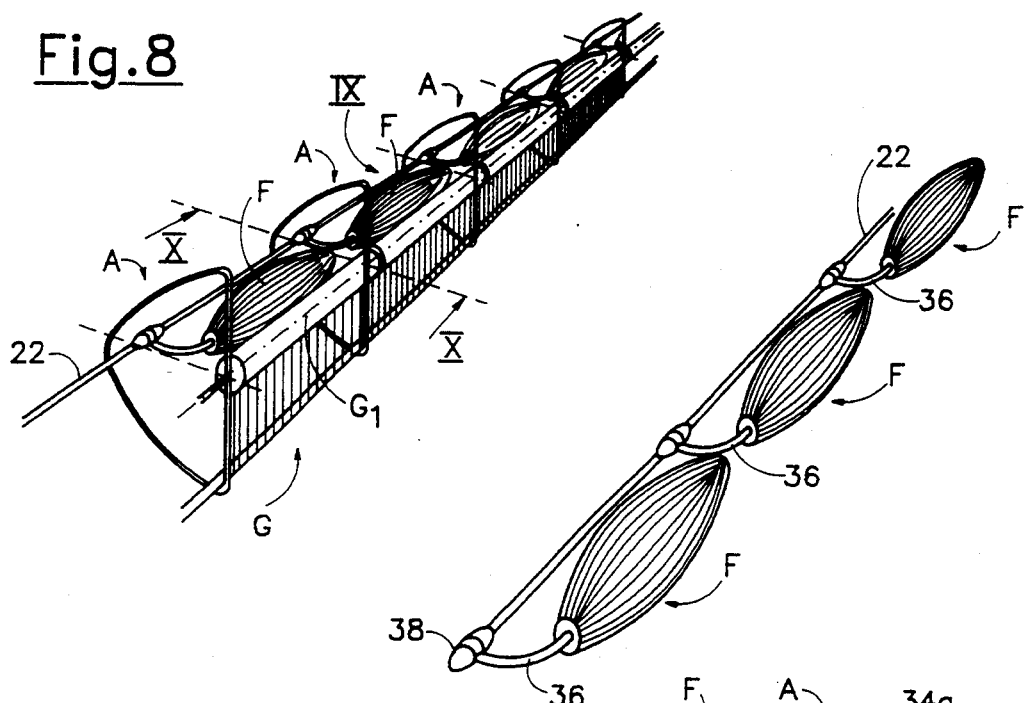
Fig.8
Fig.9
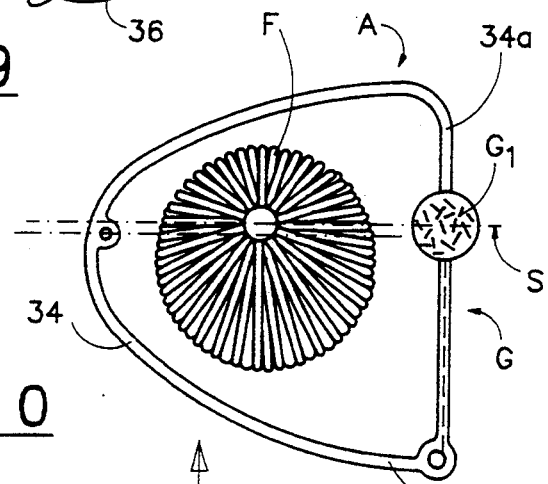
Fig.10
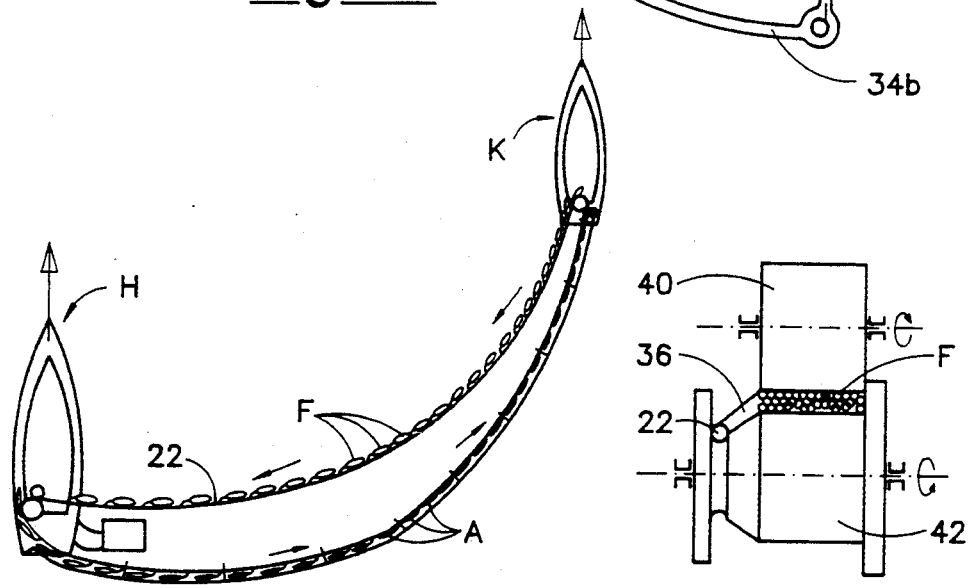
Fig.11      Fig.12

MODULAR ELEMENT FOR ABSORBING OILY SUBSTANCES FROM SURFACES OF WATER BODIES AND PURIFICATION SYSTEM USING SUCH ELEMENTS

BACKGROUND OF THE INVENTION

1. Field of the Invention

The present invention relates to a modular element for the absorption of oily substances from the surface of water bodies.

2. Description of the Related Art

The need is well-known for having available effective means for coping with the accidental pollution of the surface of the sea caused by, for example, failures or accidents undergone by tankers, pipelines and the like. Although, clearly, the best safeguard of marine or lake ecosystems is prevention of accidental leakages of petroleum or hydrocarbons, as long as the present transport systems, via sea, of petroleum and its derivatives are used, the problem of efficaciously facing possible localized pollution will continue to arise.

Present systems for removing petroleum and other polluting agents from the surfaces of water bodies use floating barriers which perform the function of bounding the polluted spot, so as to prevent it from spreading by wind and streams, while simultaneously allowing intervention by vessels capable of sucking the polluted liquid layer from the water surface and separating the hydrocarbons from the water. Such systems display the drawback that they are only effective under weather conditions which are not too unfavorable, because with choppy seas and with strong winds, the floating barriers no longer offer continuity of protection and can easily capsize. A further disadvantage effecting such systems is that the sucking systems which suck the surface liquid layer are only effective when the thickness of the polluting agent is considerable (higher than 1-2 cm); otherwise, i.e., when the polluting agent has already expanded along sea surface, the separation system must handle too large water volumes relative to the polluting agent to be separated.

In order to obviate such drawbacks, polluting agent-removal systems were proposed which use absorbent elements comprising an external porous sheath suitable for enclosing a fibrous absorbent material.

Such systems are known, e.g., from European Patent Application EP No. 295 911, which discloses a mattress or an elongated element comprising a porous external layer of non-woven polyolefinic fibres containing porous particles, with the external layer being sewn with an elastic yarn in such a way as to define equidistant seam lines.

European Patent Application EP No. 69 675 illustrates an absorbent carpet for hydrocarbons in which a plurality of absorbent granules based on cellulose fibres are interposed between container nets made from yarns constituted by polyester filaments, with mesh size smaller than the granule size.

Such systems known from the prior art are affected by the drawback that they must use large volumes of absorbent elements because, in the initial condition, i.e., before the absorption, a large fraction of the total volume is occupied by the "pores" of the absorbent particles. Clearly, such a large volume, relative to the amount of absorbable agent per unit weight of absorbent element, determines limitations in the amount of absorbent elements which can be transported to the intervention site, which may often be far away from coast. Furthermore, the porous particles used to date suffer from limited recyclability, because wringing out a high percentage content of the polluting agent absorbed inside them is difficult. In some cases, destroying the absorbent elements by incinerating them is preferred.

SUMMARY OF THE INVENTION

The purpose of the present invention is to provide a modular absorbent element of the type comprising an external porous sheath suitable for enclosing a fibrous absorbent material, which does not display the above said drawbacks. and which is inexpensive, easy to use, and completely recyclehie.

According to the present invention, this purpose is achieved by the sheath having an elongated configuration with flexible walls capable of turning into a contracted configuration before use, and into an expanded configuration after the absorption of oily substances by the fibrous absorbent material.

Because of these characteristics, the modular absorbent element, before being used, has a volume which is approximately half its volume after use, with a high ratio of the active open (absorption) surface: volume.

Furthermore, following a ringing out operation, the polluting agent is mostly removed from the element which is capable of returning to its initial contracted configuration, also in a partially collapsed form.

In accordance with a first embodiment, the modular element has in its contracted configuration, a substantially star-like cross-section with concave side walls capable of assuming, in its expanding configuration, a substantially polygonal cross-section.

In accordance with a second embodiment, the modular absorbent element has, in its contracted configuration, a flattened cross-section of substantially lenticular shape capable of assuming, in its expanded configuration, a substantially circular cross-section.

The modular absorbent elements according to the present invention can be used "in bulk" (i.e., as loose elements obtained by shearing), i.e., by distributing them along the polluted surface as size-length pieces, or, in the elongated, ribbon-shaped version, they can advantageously be assembled as bundles arranged in series on a carrier rope wound onto two drive pulleys respectively installed on board two vessels suitable for sailing along substantially parallel courses in correspondence with the polluted region. In that case, the rope is caused to move, with a to-and-fro movement, at a substantially perpendicular trajectory to the direction of advancement of said vessels and can be submitted to wringing on board one or both of said vessels. In the embodiment in which the modular elements are fastened to a mobile rope, it is advantageous if a floating barrier is used which is constrained, at its ends, to the vessels, so as to define a bounded surface region with a higher concentration of oily polluting agent and consequently obtain a more effective operation of the modular absorbent elements.

Further advantages and characteristics of the present invention, as well as further embodiments will clearly appear from the examination of the following disclosure in detail supplied for merely exemplifying, non-limitative purposes, by referring to the accompanying drawings, in which:

BRIEF DESCRIPTION OF THE DRAWINGS

FIG. 8 shows a perspective view of a variation of the application of FIG. 5;

FIG. 9 is a detail view, on an enlarged scale, of FIG. 8;

FIG. 10 is a cross-sectional view according to the section line X—X of FIG. 8;

FIG. 11 shows a plan view of the polluting agent-removal system of FIG. 8;

FIG. 12 shows a schematic view of a wringing out device for the modular elements, used in the polluting agent-removal system of FIG. 8;

DESCRIPTION OF THE PREFERRED EMBODIMENT

Figure 1:
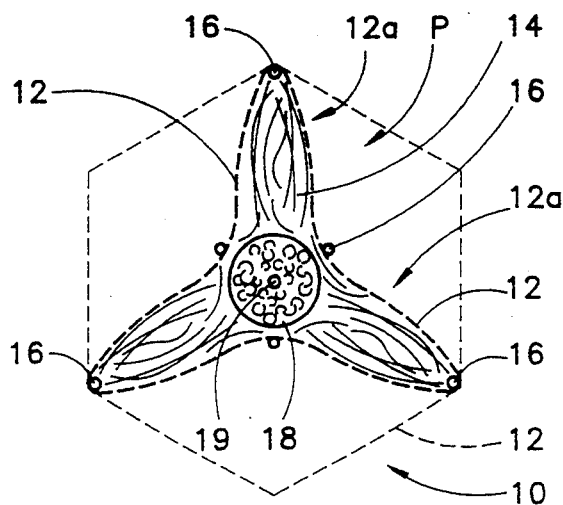
FIGS. 1-2 are cross-sectional views of modular absorbent elements according to two embodiments of the invention.

Referring to the drawings, a continuous modular absorbent element (10) is generally illustrated, comprising an external net (12) of a polyolefinic polymeric material, suitable for containing water-repellant polyolefinic fibres (14). Such fibres, preferably having a count of approximately 2.8 dtex, absorb, under conditions of static immersion, an oil weight which is approximately 30 times as high as their own weight (approximately 11 times after a strong shaking). Alternatively to, or jointly with, said net (12), a layer of polyolefinic non-woven or woven fabric may be used.

In the embodiment illustrated in FIG. 1, the external net was thermoformed in such a way as to take a star-like configuration in which concave side walls (P) are defined. At the "vertices" (V) of the star, exactly as at the junction zones between the substantially planar faces (12a) of the concave walls (P) of the element (10), longitudinal reinforcer element (16) of polypropylene are arranged which are in the form of an interlaced fibre rope, partially thermowelded to the net (12). At the vertices (V), the reinforcer elements (16) are thermowelded internally to the net (12), and at said concave walls (P) junction zones, the longitudinal reinforcer elements (16) are thermowelded externally to the net (12). Centrally to the element (10) there is provided a flexible core (18) made of a closed-cell foamed polyolefinic material, suitable for securing the desired buoyancy of the element (10). Centrally to said flexible core (18) there is provided a longitudinal reinforcer element (19) analogous to the above mentioned longitudinal reinforcer elements (16).

Figure 3:
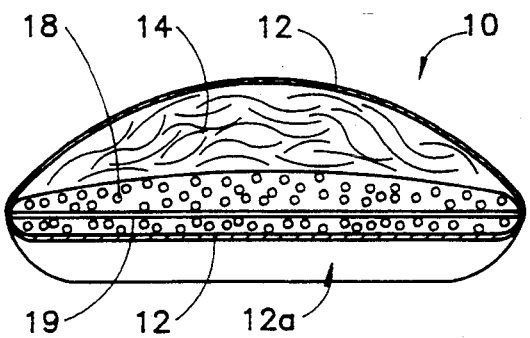
FIG. 3 is a cross-sectional view of an absorbent element according to FIG. 1, when said absorbent element displays a pod-like configuration (short-length pieces in loose form)

In order to manufacture the modular element (10), a continuous process is used in which the net (12) is fed to heated forming rolls, so as to cause said net to assume the desired configuration. Inside the interior of the shaped net the foamed core (18) is inserted together with the absorbent polyolefinic fibres (14) which, owing to the temperature reached by the net (12) during the thermoforming step, partially adhere to the net. In that way, a manufactured article is obtained in the form of a bundle which can be cut when hot, in correlation with the different used typologies, so as to thermoweld the net (12) to the central core (18) in the cut regions (FIG. 3). When the element (10) is used, on considering the inert internal volume occupied by the foamed core (18), volume increases of 2.5-3 times the initial volume are achieved. Of course, to such a volume increase a change corresponds in the shape of the cross-section, which from a star-like or triangular configuration turns into a substantially hexagonal cross-section (shown in dashed line in FIG. 1), with sides of approximately 2.5-3.5 cm.

Figure 2:
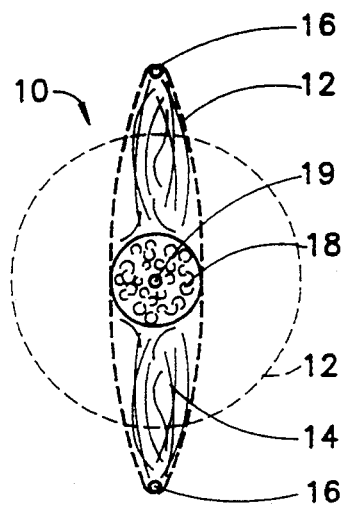

In the embodiment illustrated in FIG. 2, the cross-section displays, in the elastically contracted configuration of the element (10), a lens shape at whose vertices the longitudinal reinforcer elements (16) are arranged. In FIG. 2, the expanded configuration, after the occurred absorption of the oily substance, is illustrated with a short dashed line (a substantially circular cross-section).

Figure 4:
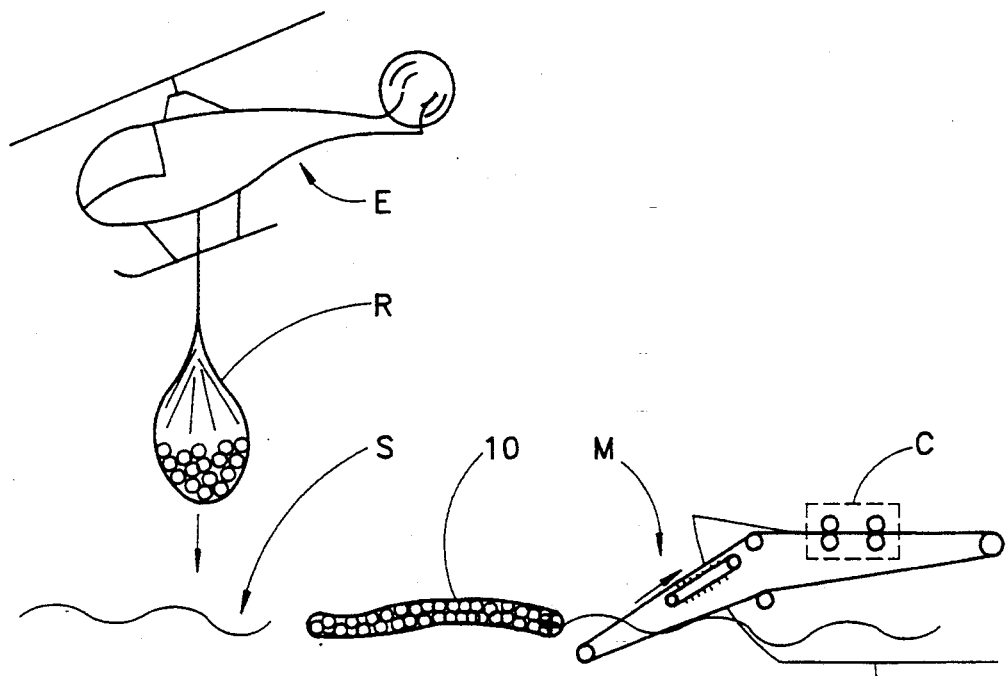
FIG. 4 shows a schematic illustration of the methodology of use of the modular element of FIG. 3.

In the instance when the absorbent elements (10) are cut into short-length pieces (for example, as illustrated in FIG. 3), in such as to have a longitudinal size which is either equal to or slightly longer than the cross size (average diameter preferably of the order of from 4.5 to 7 cm), one might think of using said elements "in their pristine state", by simply spreading them onto the polluted surface. Such a use is particularly advantageous when one wishes to intervene with extreme urgency, near a coast, and under bad weather conditions. In FIG. 4, one of the possible applications is illustrated in which the absorbent elements "in bulk" are confined inside a net (R) launched by a helicopter (E) onto a polluted surface (S). The storage of elements (10), instead of inside a net (R), can be carried out inside a container or under compressed and/or vacuum packages in order to further reduce the already reduced volume of the same elements (in an elastically contracted configuration). The skimming of the modular elements (10), whether in bulk or confined inside a net, can be carried out by means of any of the well-known systems to those skilled in the art, e.g., by means of a ribbon "skimmer" (M) (FIG. 4), which also collects the semi-solid polluting materials present on surface (S). With the skimmer (M), arranged on a subsidiary vessel (B), a wringing out unit (C) is advantageously associated, which performs the task of wringing the elements (10), in such a way as to secure an immediate re-use of said elements.

Figure 5:
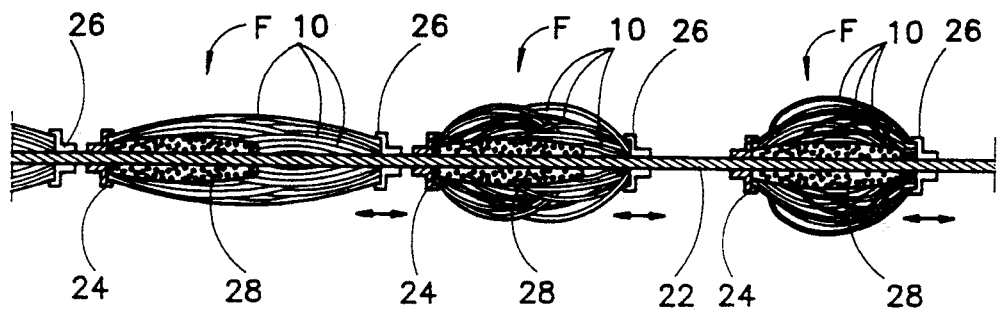
FIG. 5 shows a cross-sectional view of another application of the modular absorbent elements according to the invention, as bundles associated with a support rope.
Figure 6:
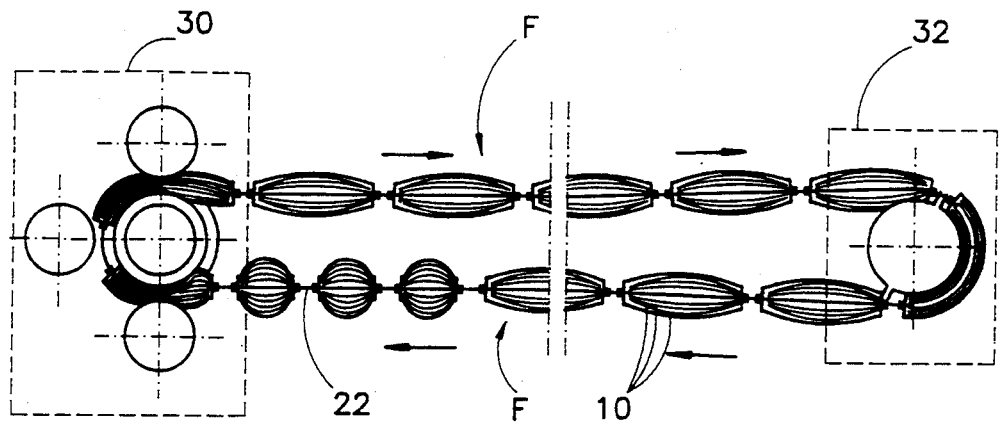
FIG. 6 shows a schematic plan view of a polluting agent-removal system using the modular elements of FIG. 5.

In FIGS. 5 and 6, another application is displayed of the absorbent elements (10), cut into short-length pieces, gathered as bundles (F) and associated with a towing rope (22). Each element (10) is provided with a first end (10a) fastened to a bushing (24) of polymeric material tightly fastened onto the rope (22), and a second end (10b) fastened to a bushing (26), also of polymeric material, slidingly mounted on the rope (22). The bushings (24) are fastened onto the rope (22) with a constant pitch, so as to define a plurality of fusiform bundles (F), constituted by filamentary elements (10) arranged around the carrier rope (22). Between each pair of fixed and sliding bushing (24) and (26) respectively, an elongated sleeve (28) of foamed polymeric material is interposed, suitable for acting as a float element for the carrier rope (22).

Such a system of absorption of oily polluting agents also enables high-viscosity materials (lumps, clots, sludges) to be partially recovered, which are "captured" inside the area defined between the rope (22) and the modular elements (10) (with such an area being variable because of the wavy motion and of the buoyancy). The change in that internal area consequent to the "opening" of the modular elements (10) is well visible in FIG. 5.

In FIG. 6, a wringing out unit (30) and respectively a return unit (32) used together with the polluting agent-removal system of FIG. 5 are schematically illustrated. Such units are respectively installed on a vessel (H) (FIG. 7) provided with a storage tank for the oily polluting agent and on a subsidiary vessel (K), both sailing along courses substantially parallel to each other (preferably at a speed of approximately 0.5 m/sec). With the carrier-rope polluting agents-removal system a floating barrier (G) is advantageously associated, laid between both vessels (H) and (K). A skimmer (M) can advantageously be associated with the vessel (H). The above disclosed system is particularly useful for high seas applications and in those cases where the reduced thickness of the oily surface layer renders practically useless any interventions with pumps and polluting agent/water separation devices.

Figure 7:
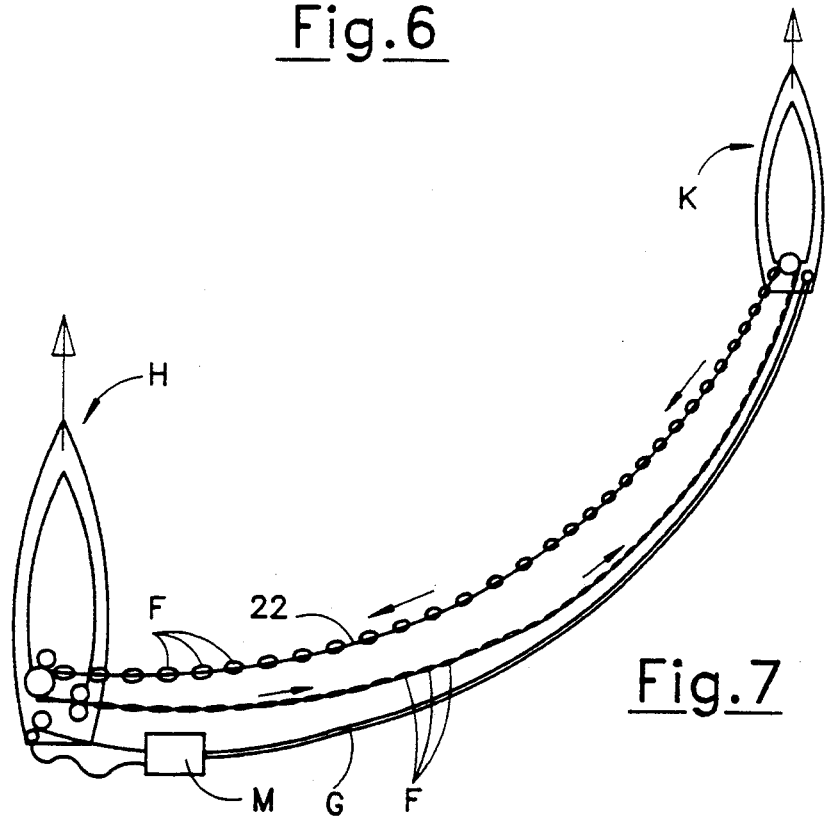
FIG. 7 illustrates the polluting agent-removal system of FIG. 6 associated with a floating container barrier.

In FIGS. 8-10 a different embodiment is illustrated of the polluting agent-removal system of FIG. 7 in which with the floating barrier (G) associated are a plurality of rings (A) (one ring per each barrier segment), defined by stiff "C"-shaped element (34) provided with an upper bent end (34a) fastened to the float (G₁) of the barrier (G) and with a lower end (34b) fastened at the lower edge of the barrier. Through the interior of rings (A) a branch, preferably the going branch, of the rope (22) is caused to run (FIG. 11) [wherein, by "going branch" that branch of the rope is meant which is caused to slide, substantially perpendicularly to the direction of advancement of the vessels, from the "mother" vessel (H) to the subsidiary vessel (K)]. Furthermore, differently to the arrangement as illustrated in FIGS. 5-6, the bundles (F) of modular elements (10) are not arranged coaxial to the towing rope (22), but parallel to it and constrained to it by means of shaped arms (36) fastened in (38) (with an Invitation-profiled head) onto the rope (22). Such a configuration enables the rope to slide through the rings in an easier way, as well as the modular elements (10) to be completely wrung out, so as illustrated in FIG. 12, wherein with (40) and (42) the two shaped wringing out rollers are indicated. The use of rings (A) associated with the floating barrier (G) makes it possible to increase the threshold advancement speed, at which the floating barriers will capsize, to continuously remove the polluting agent along the accumulation front to be favored (in particular in the presence of thin layers of oily liquid), and to prevent possible mutual interferences, tangling, and so forth, of the two branches of the towing rope (22), the tension of which keeps the going branch, constrained to the barrier, and the return branch, which can freely translate transversely to the barrier (G), spaced away from each other.

Figure 13:
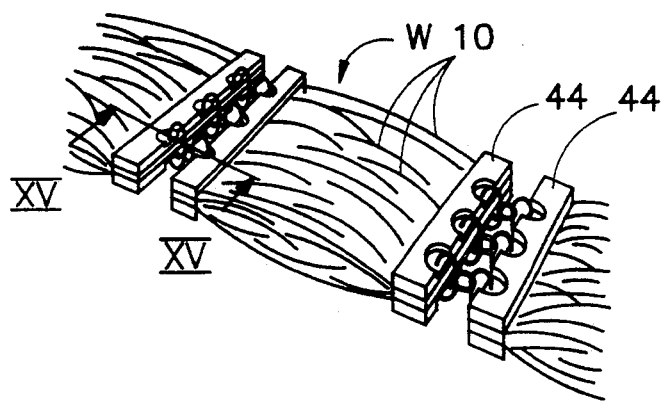
FIG. 13 shows a perspective view of a further embodiment of the invention.
Figure 14:
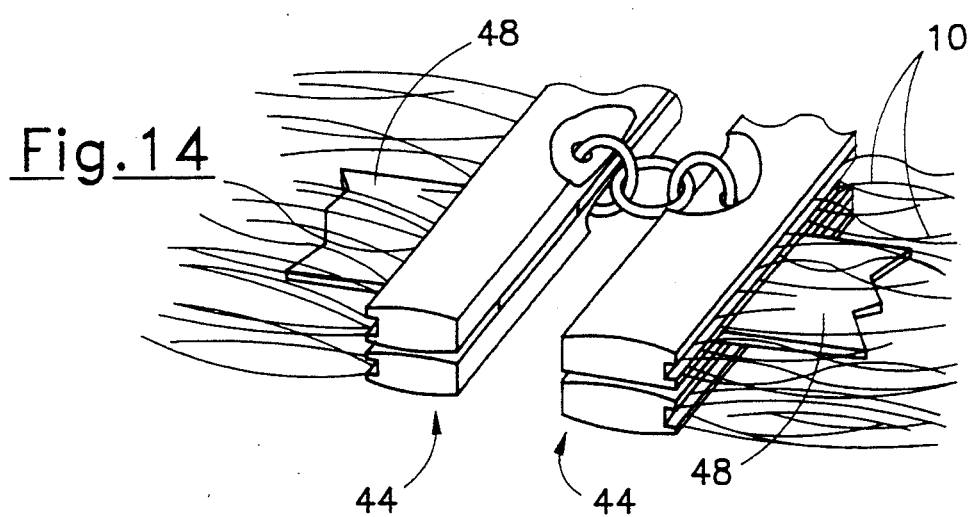
FIG. 14 is a detail view, on enlarged scale, of FIG. 13.
Figure 15:
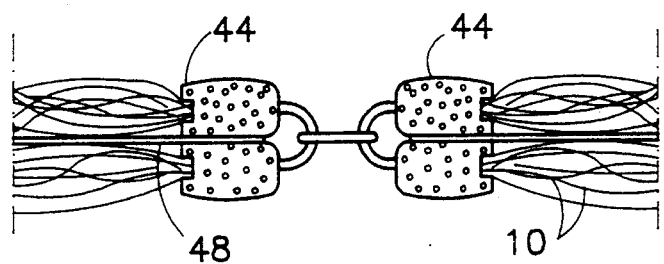
FIG. 15 shows a cross-sectional view made along section line XV—XV of FIG. 13.
Figure 16:
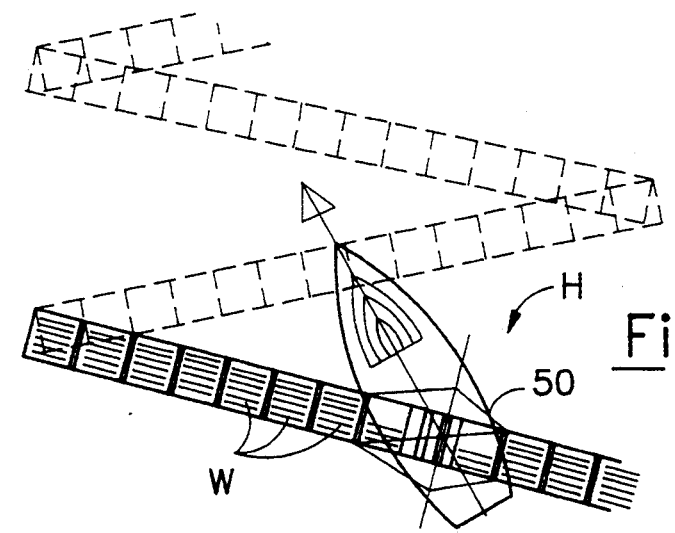
FIG. 16 shows a schematic plan view which illustrates a typology of use of the modular absorbent elements of FIG. 13.

In FIGS. 13-15, a different typology of use of the absorbent modular elements (10) is illustrated. In such an embodiment, a plurality of such absorbent elements is interposed between, and constrained to, one pair of hollow, rigid floating bars (44) made of a polymeric material, so as to form a module (W) shaped as a quadrangular carpet. The floating bars (44) of adjacent modules (W) are articulatedly linked to each other, for example by means of rapid-disengagement rings (46) (FIG. 14), so as to define a continuous stripe constituted by modules (W), and which easily matches to the wavy motion. In order to prevent the absorbent modular elements (10) from undergoing excessively high tensile stresses; the pairs of floating bars (44) of each module (W) are united to each other by side and central flexible ribbons (48) performing the task of tensile-resistant reinforcer elements only provided with side stiffness in the floating plane. The storage of modules (W) can be carried out by stacking them on each other, or by winding them in roll form. An example of use of modules (W) is illustrated in FIG. 16, in which with the vessel (H) a device (50) is associated for axially moving and wringing out the modules (W); it clearly results that by suitably combining the motion of slow advancement of the vessel (H) with the axial movement of modules (W) linked to each other, the floating polluting agents can be removed from the desired surface of the water body. According to a different use modality, groups of modules (W) are installed in correspondence of the polluted region, and are subsequently recovered by vessels provided with tanks for storing them. Furthermore, the use is provided of elements (W) as alternating parallel barriers for the temporary protection of coast from accidental pollutions, in particular under unfavourable sea conditions. In such an application, each module is preferably provided with ballasted side panels (not depicted in the drawings), suitable for acting as floating barriers.

We claim:

1. A system for absorbing an oily substance from the surface of a body of water, the oily substance located between two platforms, the system comprising:

A) a rope extending between two return devices, each return device mounted on a different one of the platforms, at least one of the platforms being movable for allowing transverse movement of the rope across the oily substance;

B) a plurality of modular elements arranged lengthwise along the rope, each modular element having ends, each modular element comprising:

i) a fusiform bundle of oil absorbent elements arranged parallel to the direction of the rope, each oil absorbent element having two ends, one of said ends being fastened to a first bushing, the other of said ends being fastened to a second bushing, each oil absorbent element comprising an oil absorbent material for absorbing the oily substance, each oil absorbent element having a contracted configuration, and an expanded configuration following absorption of the oily substance, the volume of each oil absorbent element in the expanded configuration being larger than the volume in the contracted configuration;

ii) said first bushing fixedly attaching one end of each modular element to the rope for preventing longitudinal movement relative thereto; and iii) said second bushing slidably attaching the other end of each modular element to the rope for enabling longitudinal movement relative thereto in response to expansion and contraction of the oil absorbent elements;

C) means for floating the rope, said means for floating being interposed between said first and second bushings of each modular element.

2. The system according to claim 1, further comprising:

D) means for facilitating movement of the rope between the platforms; and

E) means for wringing out the absorbent elements on one of the platforms.

3. The system according to claim 1 further wherein each oil absorbent element comprises:

i) an external sheath porous to the oily substance, the sheath having an elongated configuration with flexible walls; and ii) wherein said oil absorbent material comprises a fibrous material enclosed within the sheath for absorbing the oily substance.

4. The system according to claim 1 further comprising a floating barrier laid between the platforms near the rope, said floating barrier comprising a float and a lower edge.

5. The system according to claim 4, wherein the floating barrier further comprises a plurality of ring-shaped guides attached to said floating barrier, wherein at least one branch of the rope bearing the plurality of modular elements passes through the guides.

* * * * *